United States Patent
Wang

(10) Patent No.: US 10,944,744 B2
(45) Date of Patent: Mar. 9, 2021

(54) VERIFYING TERMINAL DEVICE

(71) Applicant: Hangzhou DPtech Technologies Co., Ltd., Zhejiang Province (CN)

(72) Inventor: Futao Wang, Zhejiang Province (CN)

(73) Assignee: HANGZHOU DPTECH TECHNOLOGIES CO., LTD., Zhejiang Province (CN)

( * ) Notice: Subject to any disclaimer, the term of this patent is extended or adjusted under 35 U.S.C. 154(b) by 362 days.

(21) Appl. No.: 16/100,918

(22) Filed: Aug. 10, 2018

(65) Prior Publication Data

US 2019/0052636 A1    Feb. 14, 2019

(30) Foreign Application Priority Data

Aug. 14, 2017 (CN) .......................... 201710691066.3

(51) Int. Cl.
*H04L 29/06* (2006.01)
*G06F 21/73* (2013.01)
*H04L 9/32* (2006.01)

(52) U.S. Cl.
CPC .......... *H04L 63/0876* (2013.01); *G06F 21/73* (2013.01); *H04L 9/3226* (2013.01);
(Continued)

(58) Field of Classification Search
CPC . H04L 63/0876; H04L 63/101; H04L 9/3226; H04L 63/0236; H04L 63/0884;
(Continued)

(56) References Cited

U.S. PATENT DOCUMENTS

2011/0088089 A1* 4/2011 MacDonald .......... H04L 63/102
                                                               726/13
2014/0082693 A1* 3/2014 Wackerly .............. H04L 63/101
                                                               726/3
(Continued)

FOREIGN PATENT DOCUMENTS

CN        102932363 A      2/2013
CN        105939348 A      9/2016
(Continued)

OTHER PUBLICATIONS

"Patent Translate of CN 105939519". Powered by EPO and Google. https://worldwide.espacenet.com. Accessed Sep. 30, 2020. (Year: 2015).*

(Continued)

*Primary Examiner* — Michael R Vaughan
(74) *Attorney, Agent, or Firm* — Greenblum & Bernstein, P.L.C.

(57) ABSTRACT

Methods, devices and apparatus for verifying a terminal device are provided. In one aspect, a method includes: recording a correspondence between a source IP address of an authentication message and an MAC address of the terminal device in a first whitelist after successful authentication is performed for the terminal device based on the authentication message, where the authentication message carries an MAC address of the terminal device; querying the first whitelist based on a source IP address of a data packet when the data packet from the terminal device is monitored; confirming the terminal device is successfully authenticated if the source IP address hits the first whitelist.

16 Claims, 6 Drawing Sheets

(52) U.S. Cl.
CPC ........ *H04L 9/3242* (2013.01); *H04L 63/0236* (2013.01); *H04L 63/0884* (2013.01); *H04L 63/101* (2013.01); *H04L 63/126* (2013.01); *G06F 2221/2141* (2013.01)

(58) Field of Classification Search
CPC ..... H04L 9/3242; H04L 63/126; G06F 21/73; G06F 2221/2141
See application file for complete search history.

(56) References Cited

U.S. PATENT DOCUMENTS

| | | | | |
|---|---|---|---|---|
| 2015/0067764 | A1* | 3/2015 | Kim | H04L 63/101 726/1 |
| 2018/0032368 | A1* | 2/2018 | Choi | G06F 9/543 |
| 2018/0375862 | A1* | 12/2018 | Isola | H04L 63/0876 |
| 2019/0036954 | A1* | 1/2019 | Garcia | H04L 63/1408 |
| 2019/0190777 | A1* | 6/2019 | Uchizumi | H04L 47/32 |
| 2020/0021671 | A1* | 1/2020 | Leung | G06F 16/9566 |
| 2020/0195609 | A1* | 6/2020 | Leung | H04L 63/0236 |

FOREIGN PATENT DOCUMENTS

| | | |
|---|---|---|
| CN | 105939519 A | 9/2016 |
| CN | 106060072 A | 10/2016 |
| CN | 106230781 A | 12/2016 |
| CN | 106973126 A | 7/2017 |

OTHER PUBLICATIONS

State Intellectual Property Office of the People's Republic of China, Office Action and Search Report Issued in Application No. 201710691066.3, dated May 27, 2019, 13 pages,(Submitted with Partial Translation).

State Intellectual Property Office of the People's Republic of China, Office Action and Search Report Issued in Application No. 201710691066.3, dated Dec. 11, 2019, 18 pages. (Submitted with Machine Translation).

* cited by examiner

VERIFYING TERMINAL DEVICE

CROSS REFERENCE TO RELATED APPLICATIONS

This application claims priority to Chinese Patent Application No. 2017106910663, filed on Aug. 14, 2017, the entire content of which is incorporated herein by reference.

BACKGROUND

At present, in a main trend of access verification manners, for example, in a portal verification, a user is always required to enter information such as a user name and a password through a verification page each time a terminal device accesses a network. A verifying device determines whether the terminal device may access the network based on the entered user name and password.

SUMMARY

In view of this, the present disclosure provides a method of verifying a terminal device, and the method may be applied to a verifying device. Specifically, the present disclosure is implemented by the following technical solution.

After successful authentication is performed for the terminal device based on an authentication message, recording a correspondence between a source IP address of the authentication message and an MAC address of the terminal device in a first whitelist, wherein the authentication message carries the MAC address of the terminal device; when a data packet from the terminal device is monitored, querying the first whitelist based on a source IP address of the data packet; and when the source IP address hits the first whitelist, confirming that the terminal device has been authenticated.

In some examples, the present disclosure also provides a method of verifying a terminal device, and the method may be applied to a management device. The present disclosure is implemented by the following technical solution, including the followings.

When receiving an IP address from an verifying device, querying a second whitelist based on the IP address, wherein the second whitelist is generated by a management device based on a first whitelist sent by an verifying device and received device information of a terminal device, the first whitelist comprises a correspondence between an MAC address of a terminal device successfully authenticated by the verifying device based on an authentication message and a source IP address of the authentication message, and the authentication message carries the MAC address of the terminal device; and when the IP address hits the second whitelist, returning successful verification information to the verifying device so that the verifying device confirms that the terminal device corresponding to the IP address i has been authenticated when receiving the successful verification information.

Another aspect of the present disclosure features an apparatus for verifying a terminal device. The apparatus for verifying a terminal device may be applied to a verifying device. The apparatus may include a processor, where the processor is caused by reading and executing machine executable instructions corresponding to a logic for verifying a terminal device and stored on a machine readable storage medium to: after successful authentication is performed for the terminal device based on an authentication message, record a correspondence between a source IP address of the authentication message and an MAC address of the terminal device in a first whitelist, wherein the authentication message carries the MAC address of the terminal device; when a data packet from the terminal device is monitored, query the first whitelist based on a source IP address of the data packet; and when the source IP address hits the first whitelist, confirm that the terminal device has been authenticated.

In some examples, the present disclosure also provides an apparatus for verifying a terminal device. The apparatus for verifying a terminal device may be applied to a management device. The apparatus may include a processor, where the processor is caused by reading and executing machine executable instructions corresponding to a logic for verifying a terminal device and stored on a machine readable storage medium to: when receiving an IP address from an verifying device, query a second whitelist based on the IP address, wherein the second whitelist is generated by a management device based on a first whitelist sent by an verifying device and received device information of a terminal device, the first whitelist comprises a correspondence between an MAC address of a terminal device successfully authenticated by the verifying device based on an authentication message and a source IP address of the authentication message, and the authentication message carries the MAC address of the terminal device; and when the IP address hits the second whitelist, return successful verification information to the verifying device so that the verifying device confirms that the terminal device corresponding to the IP address has been authenticated when receiving the successful verification information.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

In prior art, a user may be required to enter information such as a user name and a password through an authentication page when a terminal device accesses a network for the first time. The terminal device may construct an authentication message based on the user name and the password entered by the user and send the message to a verifying device. The verifying device may first perform authentication for the terminal device based on the user name and the password carried in the authentication message after receiving the authentication message from the terminal device, that is, determine whether the terminal device may access the network. After the terminal device is successfully authenticated, to reduce the number of times of entering the user name and the password by the user, the verifying device may analyze a source MAC address of the authentication message as an MAC address of the terminal device and add the MAC address to a locally-stored whitelist. Alternatively, the verifying device may also analyze a source IP address of the authentication message as an IP address of the terminal device and add the IP address to the locally-stored whitelist. When the terminal device accesses the network again, the verifying device may query the whitelist based on a source MAC address or a source IP address of a data packet sent by the terminal device and determine that the terminal device has been authenticated when the source MAC address or the source IP address hits the whitelist, thereby saving operations of re-entering the user name and the password by the user.

Figure 1:
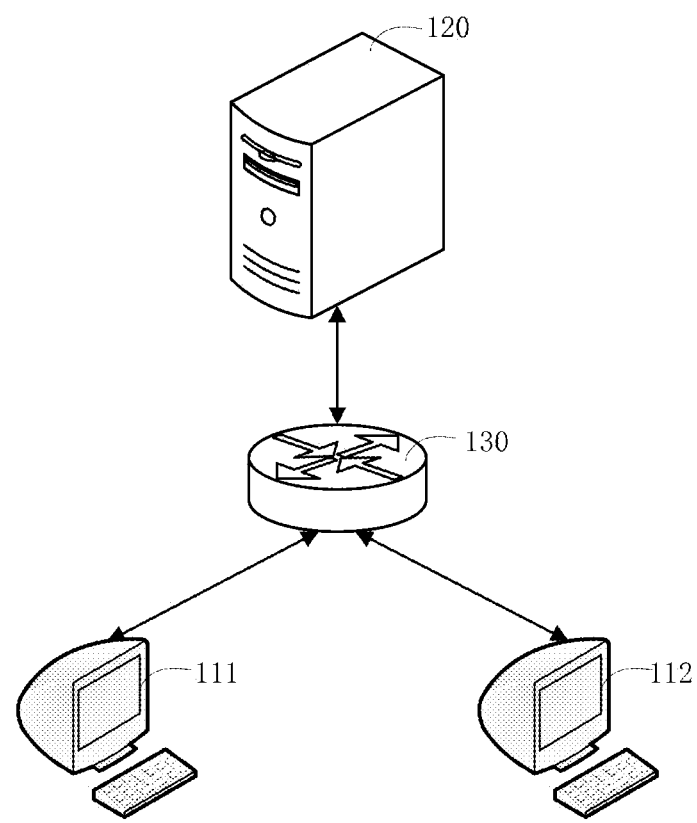
FIG. 1 is a schematic diagram illustrating network architecture of a verification system in prior art.

FIG. 1 is schematic diagram illustrating a network architecture of a verification system in prior art. As shown in FIG. 1, terminal devices 111 and 112 and a verifying device 120 are not in a same local area network.

In the above case, when a message sent by the terminal devices 111 or 112 passes through a gateway device 130, the gateway device 130 may modify a source MAC address of the terminal device 111 or 112 in a header of the message to a MAC address of the gateway device 130, that is, the source MAC address of the authentication message or a data packet received by the verifying device 120 from the terminal devices 111 or 112 is the MAC address of the gateway device 130 rather than the MAC addresses of the corresponding terminal devices 111 or 112. At this time, if the use of the MAC-address-based whitelist is continued, a case that all devices under one gateway may be deemed as authenticated if one device under the gateway is successfully authenticated may be caused, thereby losing the significance of authentication.

On one hand, in a practical application, an IP address may be assigned to a terminal device based on Dynamic Host Configuration Protocol (DHCP) in a local area network. Thus, the IP address of the terminal device may change every time the terminal device accesses the network. At this time, if the use of the IP-address-based whitelist is continued, the terminal device may fail in verification. A user is required to re-enter the user name and the password through an authentication page for authentication.

To solve the above problems, the present disclosure provides a method of verifying a terminal device to reduce the possibility that the terminal device fails in verification.

Figure 2:
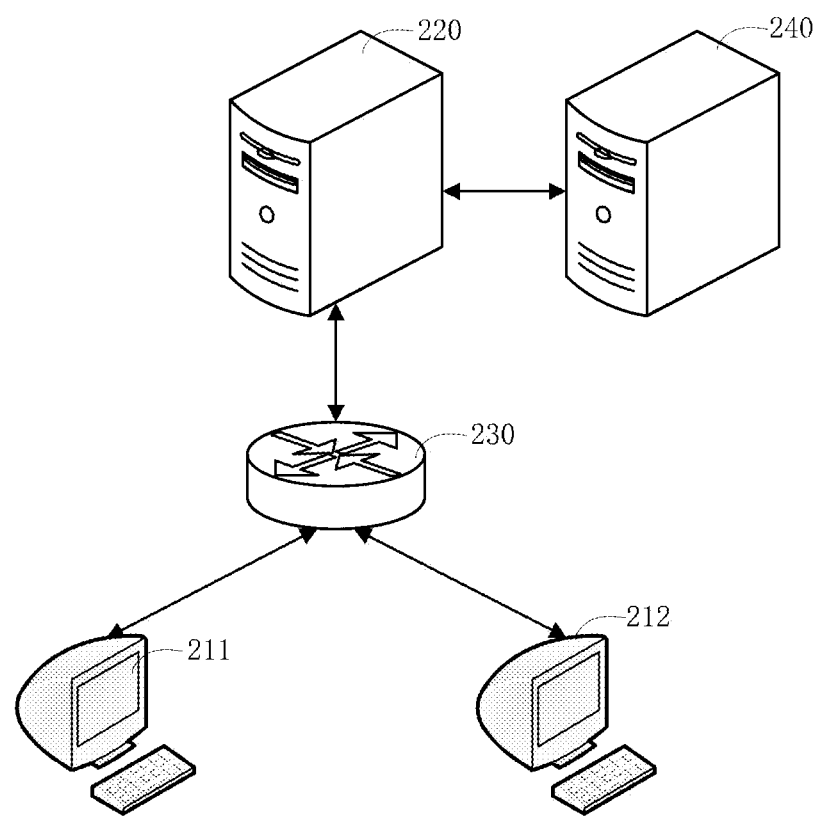
FIG. 2 is a schematic diagram illustrating network architecture of a verification system according to an example of the present disclosure.

FIG. 2 is a schematic diagram illustrating network architecture of a verification system according to an example of the present disclosure. Compared with the verification system shown in FIG. 1, the verification system shown in FIG. 2 may include a management device 240 as well as terminal devices 211-212, a verifying device 220 and a gateway device 230. The management device 240 may establish connection with a plurality of verifying devices 220. The management device 240 may be an independent physical device and may also be a virtual logical device, for example, located in a same physical apparatus as the verifying device 220, which is not limited in the present disclosure.

Figure 3A:
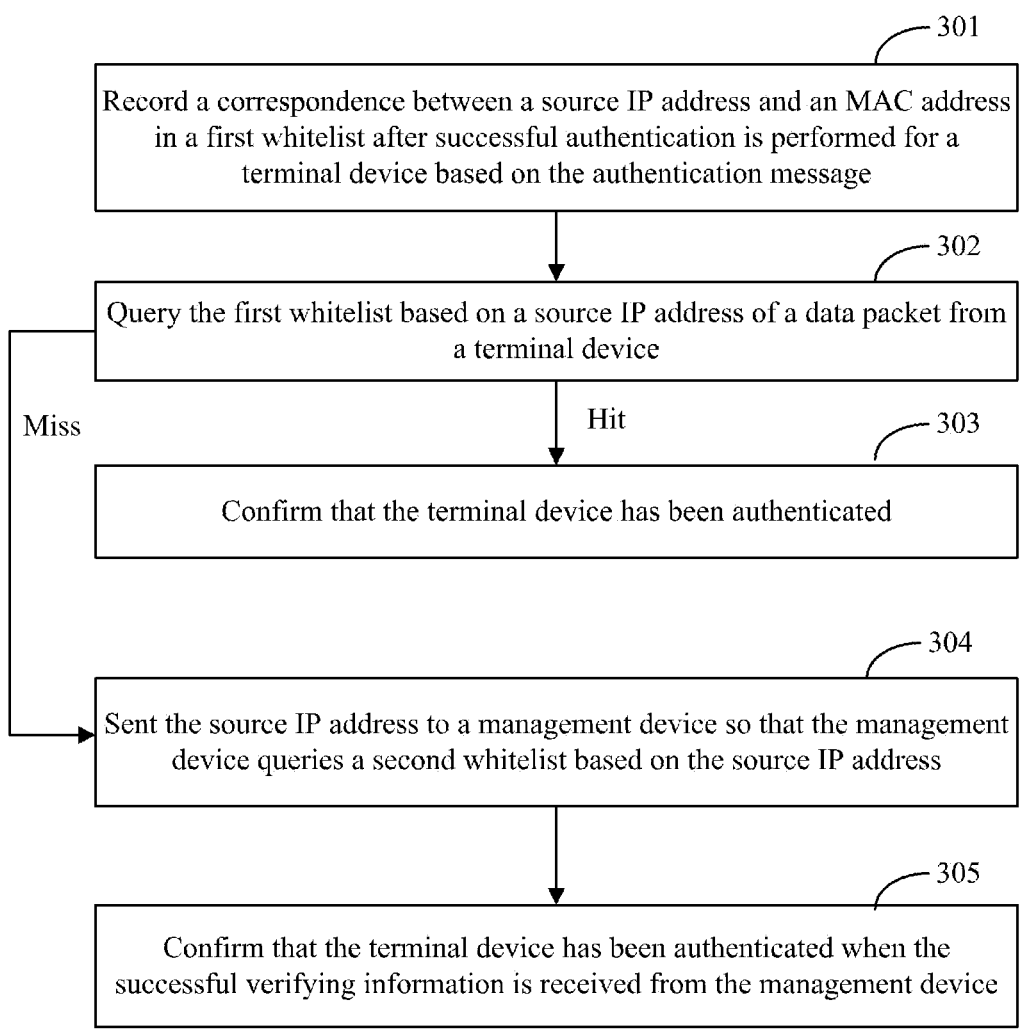
FIG. 3A is a flowchart illustrating a process of a method of verifying a terminal device according to an example of the present disclosure.

FIG. 3A is a flowchart illustrating a process of a method of verifying a terminal device according to an example of the present disclosure. The method may be applied to the verifying device 220 shown in FIG. 2 and include the following blocks.

At block 301, when a terminal device is authenticated based on an authentication message, a correspondence between a source IP address of the authentication message and an MAC address of the terminal device is recorded in a first whitelist, where the authentication message carries the MAC address of the terminal device.

At block 302, when a data packet from the terminal device is monitored, the first whitelist is queried based on a source IP address of the data packet, where the first whitelist includes an authenticated source IP address and a corresponding MAC address of the terminal device.

At block 303, if the source IP address hits the first whitelist, it is confirmed that the terminal device has been authenticated.

At block 304, if the source IP address misses the first whitelist, the source IP address is sent to a management device so that the management device queries a second whitelist based on the source IP address and returns successful verification information when the source IP address hits the second whitelist. The second whitelist is generated by the management device based on the first whitelist sent by the verifying device and received device information of the terminal device. Also, the source IP address misses the second whitelist, the management device may return verification failure information.

At block 305, when the successful verification information is received from the management device, it is confirmed that the terminal device has been authenticated.

Figure 3B:
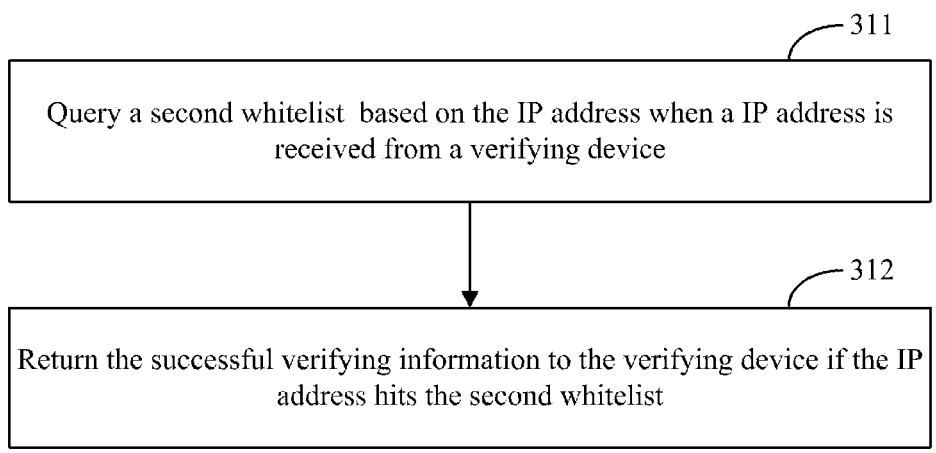
FIG. 3B is a flowchart illustrating a process of a method of verifying a terminal device according to another example of the present disclosure.

Corresponding to the example shown in FIG. 3A, FIG. 3B is a flowchart illustrating a process of a method of verifying a terminal device according to another example of the present disclosure. The method may be applied to the management device 240 shown in FIG. 2, and may include the following blocks.

At block 311, when a source IP address is received from a verifying device, a second whitelist is queried based on the source IP address. The second whitelist is generated by the management device based on the first whitelist sent by the verifying device and received device information of the terminal device. The first whitelist includes a correspondence between the source IP address of the authentication message with which the terminal device is authenticated by the verifying device and the MAC address of the terminal device.

At block 312, if the source IP address hits the second whitelist, the successful verification information is returned to the verifying device so that the verifying device confirms a corresponding terminal device has been authenticated when receiving the successful verification information.

In the example, similar to the prior art, when the terminal device 211 or 212 accesses a network for the first time, a user is required to enter information such as a user name and a password through an authentication page. The terminal device 211 or 212 may construct an authentication message based on the user name and the password entered by the user and send the message to the verifying device 220. Since the terminal devices 211, 212 and the verifying device 220 are not in a same local area network, the gateway device 230 may first receive the authentication message and modify a source MAC address of the terminal device 211 or 212 in a header of the authentication message to a MAC address of the gateway device 230. In this case, since the MAC address in the header of the authentication message is already modified to the MAC address of the gateway device 230, to enable the verifying device 220 to obtain the MAC address of the terminal device 211 or 212, an access device accessed by the terminal devices 211, 212 may add the MAC address of the terminal device 211 or 212 in a payload portion of the authentication message, for example, add the MAC address of the terminal device and the like in a reserved field of the message and send the modified authentication message to the verifying device 220. The access device may include an access switch, a router, or a gateway device (the gateway device 230 shown in FIG. 2 as an example). The terminal devices 211 and 212 may also add their own MAC address in the payload portion of the authentication message, for example, add the MAC address of the terminal device and the like in the reserved field of the message.

After receiving the authentication message including the terminal device MAC address, the verifying device 220 may analyze the authentication message to obtain information such as the source IP address, the terminal device MAC address, the user name and the password. After confirming the terminal device 211 or 212 is authenticated based on the user name and the password, the verifying device 220 may take the source IP address as an IP address currently used by the terminal device 211 or 212, thereby obtaining device information such as the IP address and the MAC address of the terminal device 211 or 212.

Next, the verifying device 220 may add an entry in the first whitelist, where the entry includes a correspondence between the source IP address in the authentication message and the MAC address of the terminal device, thereby solving a problem that the verifying device cannot obtain the MAC address of the terminal device when the terminal device and the verifying device are not in a same local area network. It is noted that an IP address of a terminal device may be changed every time the terminal device accesses a network. The IP address that was successfully authenticated previously may have been assigned to another device. Based on this, aging time may be added in the first whitelist. When a particular entry in the first whitelist is not hit by a subsequent message for a preset time, that is, the aging time expires, this entry may be deleted.

The verifying device 220 may send the first whitelist to the management device 240. Specifically, the verifying device 220 may send the first whitelist to the management device 240 according to a time period preset by a user. Or the verifying device 220 may also send the updated first whitelist to the management device 240 after adding device information of a newly-authenticated terminal device to the first whitelist. After receiving the first whitelist, the management device 240 may add specific contents in the first whitelist to the second whitelist maintained by the management device 240. Each verifying device 220 may have one local first whitelist, and for the management device 240 corresponding to multiple verifying devices, the second whitelist may include multiple first whitelists.

On one example, the terminal devices 211 and 212 may periodically construct an advertisement message carrying the device information of the terminal device such as an MAC address and a currently-used IP address and send the advertisement message to the management device 240. The management device 240 may analyze the advertisement message and obtain the device information of the terminal device such as the IP address and the MAC address after receiving the advertisement message from the terminal devices 211 or 212.

In another example, an access device accessed by the terminal devices 211 and 212 may periodically construct an advertisement message based on received data packet from the terminal device and send the advertisement message to the management device 240. The advertisement message carries the device information of the terminal device such as the currently-used IP address and the MAC address. After receiving the advertisement message, the management device 240 may analyze the advertisement message and obtain the device information of the terminal device such as the IP address and the MAC address.

In the present disclosure, only the authentication message or the advertisement message may include an MAC address of a terminal device in a reserved field of the corresponding message. Since the MAC address is located at a payload portion of the message, the MAC address may not be replaced by the access device. The MAC address of the terminal device may be added by the terminal device 211 or 212 and may also be added by the access device.

After receiving an advertisement message from a particular terminal device, the management device 240 may query the second whitelist based on the MAC address in the device information. Since the terminal device 211 or 212 corresponding to the advertisement message may be an authenticated terminal device and may also be an unauthenticated terminal device, it is firstly required to detect whether the terminal device 211 or 212 is already authenticated. Since an IP address of the terminal device 211 or 212 is changeable, the second whitelist maintained by the management device 240 may identify authentication status of terminal devices based on the MAC address.

Specifically, the management device 240 may query whether an MAC address hits the second whitelist based on the MAC address of the terminal device 211 or 212 in a particular region of the received advertisement message. If the second whitelist is missed, no operation is performed for the second whitelist. If the second whitelist is hit, it is detected whether the IP address corresponding to the MAC address in the second whitelist is same as the source IP address of the advertisement message. Since an IP address may be assigned to a terminal device based on DHCP in a local area network, the IP address of the terminal device 211 or 212 may be changed. That is, if the IP address corresponding to the MAC address in the second whitelist is different from the source IP address of the advertisement message received by the management device 240, it indicates that the IP address of the terminal device 211 or 212 has been changed. In this case, the management device 240 may update the IP address corresponding to the MAC address in the second whitelist to the source IP address of the advertisement message, so that a correspondence between the IP address and the MAC address in the second whitelist is updated. In this way, the IP address of each terminal device in the second whitelist stored by the management device 240 is consistent with the actual IP address of the terminal device 211 or 212, thereby reducing the possibility that the terminal device 211 or 212 fails in verification due to change of the IP address.

In the present disclosure, the second whitelist is used mainly based on the following several application scenarios. In an example of the present disclosure, there may be a plurality of verifying devices in a network. In this case, when one authenticated terminal is migrated from a management region of a particular verifying device to a management region of another verifying device, the authenticated terminal device does not require re-authentication by querying the second whitelist. In another example of the present disclosure, when a particular verifying device may not perform verification due to possible failure or reboot, an access device may route a data packet from the terminal device to another verifying device. Similarly, the authenticated terminal device does not require re-verification by querying the second whitelist.

In this example, when monitoring a data packet from a particular terminal device 211, the verifying device 220 may query the first whitelist based on a source IP address of the data packet, e.g. the IP address of the terminal device 211, so as to confirm whether the terminal device has been authenticated.

Based on the above query result, if the IP address hits the first whitelist, it means that the terminal device 211 has been authenticated previously. Thus, the verifying device 220 may directly confirm that the terminal device 211 has been authenticated, thereby saving the operation of re-entering a user name and a password by a user through an authentication page.

If the source IP address misses the first whitelist, it means that the terminal device 211 may not be successfully authenticated previously or may be authenticated with a changed IP address. Thus, the verifying device 220 may send the source IP address to the management device 240 so that the management device 240 can further confirm whether the terminal device 211 has been authenticated based on the second whitelist.

In this example, the management device 240 may query the second whitelist based on the received source IP address.

Based on the query result, if the source IP address hits the second whitelist, it means that the terminal device 211 has been authenticated previously with a changed IP address. Thus, the management device 240 may return successful verification information to the verifying device 220. After receiving the successful verification information, the verifying device 220 may confirm that the terminal device 211 has been authenticated, thereby saving the operation of entering the user name and the password by the user through the authentication page.

In a practical application, the successful verification information may also include device information of the terminal device 211 in the second whitelist. After receiving the successful verification information, the verifying device 220 may also update the first whitelist based on the device information in addition to confirming that the terminal device 211 is authenticated. Specifically, after receiving the successful verification information, the verifying device 220 may query the first whitelist based on an MAC address (or device information other than an IP address) in the device information included in the successful verification information. If the MAC address hits the first whitelist, the IP address in the first whitelist corresponding to the MAC address is updated to the IP address in the device information. If the MAC address misses the first whitelist, it means that the terminal device 211 is migrated from another verifying device, and then a correspondence between the MAC address and the IP address of the terminal device 211 are added to the first whitelist. With such a manner, the verifying device 220 may confirm that a terminal device has been authenticated based on the updated first whitelist when monitoring a data packet from the terminal device again, without any need for the management device 240 to further confirm that the terminal device authentication status, thereby improving processing efficiency for data packets.

If the source IP address misses the second whitelist, it means that the terminal device 211 is not successfully authenticated. At this time, the management device 240 may return verification failure information to the verifying device 220. After receiving the verification failure information from the management device 240, the verifying device 220 may send an authentication page to the terminal device 211. A user may enter a user name and a password through the authentication page and the verifying device 220 may perform authentication for the terminal device 211 based on the user name and the password entered by the user, that is, confirm whether the terminal device 211 may access the network.

As can be seen from the above examples, the verifying device may add an entry in the first whitelist after performing successful authentication for the terminal device based on the authentication message. The entry includes a correspondence between the source IP address in the authentication message and the MAC address of the terminal device which is also carried in the authentication message. On the other hand, the management device may update and maintain a second whitelist based on the first whitelist sent by the verifying device and received device information of the terminal device. In this way, it is guaranteed that the device information in the second whitelist is consistent with actual device information. When verification confirmation is performed for a terminal device, the verifying device may firstly perform verification confirmation for the terminal device based on the IP address of the terminal device and the first whitelist. For a terminal device whose IP address misses the first whitelist, the verifying device may send the IP address to the management device. Then the management device may perform verification confirmation for the terminal device based on the second whitelist and the received IP address. For a terminal device that is confirmed to be successfully authenticated, a user is not required to re-enter a user name and a password through an authentication page. The technical solution of the present disclosure is applicable to a case that a terminal device and a verifying device are not in a same local area network and an IP address of the terminal device is changeable. In this way, user operations are simplified and the possibility that the terminal device fails in verification due to IP address changing is reduced.

With a network system shown in FIG. 2 as an example, it is assumed that the MAC address of the terminal device 211 is an MAC address 1 and the MAC address of the terminal device 212 is an MAC address 2. When the terminal device 211 and the terminal device 212 access a network for the first time in a particular day, based on DHCP, an IP address assigned to the terminal device 211 is an IP address 1 and an IP address assigned to the terminal device 212 is an IP address 2.

Since the terminal device 211 accesses the network for the first time, a user is required to enter information such as a user name and a password through an authentication page. The terminal device 211 may construct an authentication message based on the user name and the password entered by the user and send the message to the verifying device 220.

The gateway device 230 may firstly receive the authentication message, add the MAC address 1 to the authentication message and then send the modified authentication message to the verifying device 220. After receiving the modified authentication message, the verifying device 220 may analyze the modified authentication message to obtain a source IP address of the modified authentication message as the IP address 1, the user name and the password carried in the modified authentication message and the MAC address 1 added by the gateway device 230 in the authentication message. After determining that the terminal device 211 is successfully authenticated based on the user name and the password, the verifying device 220 may add the device information of the terminal device 211 including the IP address 1 and the MAC address 1 to the first whitelist. Similarly, if the terminal device 212 is also successfully authenticated, the first whitelist as shown in the following Table 1 may be stored in the verifying device 220.

TABLE 1

| IP address | MAC address |
|---|---|
| IP address1 | MAC address1 |
| IP address2 | MAC address2 |

When the verifying device 220 receives a data packet with a source IP address as the IP address 1 from the terminal device 211, because the IP address 1 hits the first whitelist shown in the above Table 1, the verifying device 220 may confirm the terminal device 211 has been authenticated. The verifying device 220 may forward the data packet sent by the terminal device 211 without need for a user to enter a user name and a password for authentication again.

After adding entries in the first whitelist shown in the above Table 1, the verifying device 220 may send the first whitelist to the management device 240. The management device 240 may add the first whitelist to the locally-stored second whitelist.

On the other hand, the gateway device 230 may periodically construct an advertisement message carrying device information of the terminal device 211 such as the IP address 1 and the MAC address 1 based on the received data packet from the terminal device 211, and send the advertisement message to the management device 240. After receiving the advertisement message, the management device 240 may analyze the advertisement message to obtain the device information of the terminal device 211 such as the IP address 1 and the MAC address 1.

It is assumed that when the terminal device 211 and the terminal device 212 access a network again on the next day, the IP address assigned to the terminal device 211 based on DHCP is changed into an IP address 3 but the IP address assigned to the terminal device 212 is still the IP address 2. In this case, when receiving the advertisement message from the gateway device 230, the management device 240 may obtain the device information of the terminal device 211 such as the IP address 3 and the MAC address 1 and the device information of the terminal device 212 such as the IP address 2 and the MAC address 2 by analysis.

The management device 240 may query the second whitelist based on the MAC address 1. Since the IP address corresponding to the MAC address 1 in the second whitelist is the IP address 1 which is different from the IP address 3 of the terminal device 211 in the advertisement message received by the management device 240, the management device 240 may update the IP address 1 corresponding to the MAC address 1 in the second whitelist to the IP address 3. Similarly, the management device 240 may query the second whitelist based on the MAC address 2. Since both the IP address corresponding to the MAC address 2 in the second whitelist and the IP address of the terminal device 212 in the advertisement message are the IP address 2, the management device 240 does not need to update the IP address 2 corresponding to the MAC address 2 in the second whitelist. At this time, the management device 240 may update the second whitelist as shown in the following Table 2.

TABLE 2

| IP address | MAC address |
|---|---|
| IP address3 | MAC address1 |
| IP address2 | MAC address2 |

When the verifying device 220 receives a data packet with a source IP address as the IP address 3 from the terminal device 211, since the IP address 3 misses the first whitelist shown in the Table 1, the verifying device 220 may send the IP address 3 to the management device 240 and the management device 240 may perform further verification for the terminal device 211 based on the second whitelist shown in the Table 2.

After receiving the IP address 3 from the verifying device 220, the management device 240 may query the second whitelist shown in the Table 2 based on the IP address 3. Since the IP address 3 hits the second whitelist, the management device 240 may return successful verification information to the verifying device 220. After receiving the successful verification information from the management device 240, the verifying device 220 may confirm that the terminal device 211 has been authenticated. The verifying device 220 may forward the data packet sent by the terminal device 211 without need for a user to enter a user name and a password for authentication again.

On the other hand, the above successful verification information may also include the device information of the terminal device 211 such as the IP address 3 and the MAC address 1. After receiving the successful verification information, the verifying device 220 may also query the first whitelist shown in the Table 1 based on the MAC address 1 in addition to confirming that the terminal device 211 has been authenticated. Since the IP address corresponding to the MAC address 1 in the first whitelist is the IP address 1 which is different from the IP address 3 of the terminal device 211 in the successful verification information, the verifying device 220 may update the IP address 1 corresponding to the MAC address 1 in the first whitelist to the IP address 3 so as to obtain an updated first whitelist shown in the following Table 3.

TABLE 3

| IP address | MAC address |
|---|---|
| IP address3 | MAC address1 |
| IP address2 | MAC address2 |

Subsequently, when the verifying device 220 receives a data packet with a source IP address as the IP address 3 from the terminal device 211 again, since the IP address 3 hits the updated first whitelist shown in the Table 3, the verifying device 220 may confirm that the terminal device 211 is successfully authenticated directly. The verifying device 220 may forward the data packet sent by the terminal device 211 without the management device 240 performing further verification.

Figure 4:
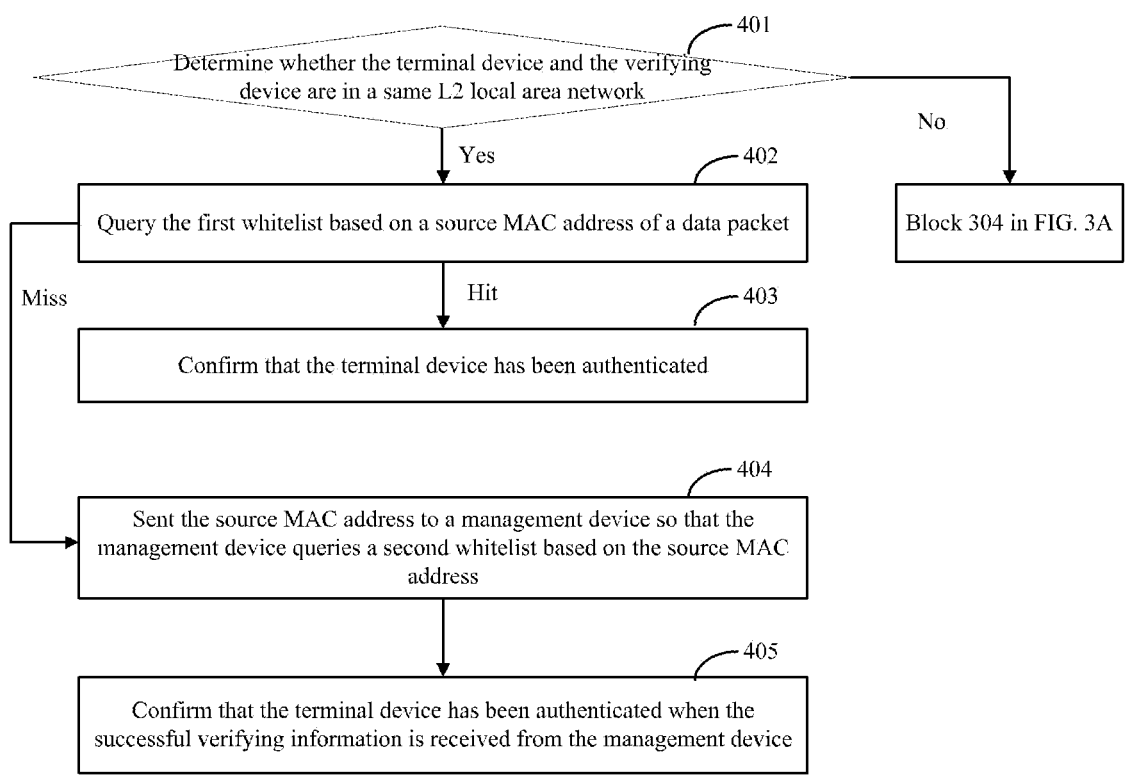
FIG. 4 is a flowchart illustrating a process of a method of verifying a terminal device according to still another example of the present disclosure.

In some examples of present disclosure, a terminal device and a verifying device are in a same layer 2 local area network, that is, the MAC address of the terminal device is not replaced by an access device. FIG. 4 is a flowchart illustrating a process of a method of verifying a terminal device according to still another example of the present disclosure.

At block 401, it is determined whether the terminal device and the verifying device are in a same layer 2 local area network when the source IP address misses the first whitelist in previous block 303.

At block 402, the first whitelist is queried based on a source MAC address of the data packet when the terminal device and the verifying device are in a same layer 2 local area network. If the terminal device and the verifying device are not in a same layer 2 local area network, go to previous block 304.

At block 403, the verifying device confirms that the terminal device is successfully authenticated when the source MAC address hits the first whitelist.

At block 404, the source MAC address is sent to the management device when the source MAC address misses the first whitelist. So that the management device queries the second whitelist based on the source MAC address and returns successful verification information when the source MAC address hits the second whitelist, wherein the second whitelist is generated by the management device based on the first whitelist sent by the verifying device and received device information of the terminal device.

At block 405, the verifying device confirms that the terminal device has been authenticated when the successful verification information is received from the management device.

After querying a first whitelist based on a source IP address of a data packet from a particular terminal device, the verifying device may determine whether the terminal device and the verifying device are in a same layer 2 local area network if the source IP address misses the first whitelist. Specifically, the verifying device may query a locally-stored Address Resolution Protocol (ARP) table based on the source IP address and an ingress interface of the data packet. If the source IP address and the ingress interface hit the ARP table, it means that the terminal device and the verifying device are in the same layer 2 local area network. Alternatively, the verifying device may also determine whether a Time To Live (TTL) value in the data packet is one of the four values 255, 128, 64 and 32. If yes, it means the terminal device and the verifying device are in the same layer 2 local area network.

Based on the above determining result, if the terminal device and the verifying device are not in the same local area network, the verifying device may send the source IP address to the management device as shown in the examples in FIGS. 3 and 4, and the management device may perform further verification for the terminal device.

If the terminal device and the verifying device are in a same local area network, a source MAC address of a data packet from the terminal device is the MAC address of the terminal device. Thus, the verifying device may query the first whitelist based on the source MAC address.

Based on the above query result, if the source MAC address hits the first whitelist, it means that the above terminal device is successfully authenticated previously. Thus, the verifying device may confirm that the terminal device has been authenticated, thereby saving the operation of entering a user name and a password by a user through an authentication page provided by the terminal device.

If the above source MAC address misses the first whitelist, it means that the above terminal device may not be authenticated or may be authenticated previously by another verifying device. Thus, the verifying device may send the source MAC address to the management device which may perform further verification for the terminal device based on the second whitelist.

When receiving the source MAC address from the verifying device, the management device may query the second whitelist based on the source MAC address. If the source MAC address hits the second whitelist, it means that the terminal device has been authenticated previously. Thus, the management device may return successful verification information to the verifying device. If the source MAC address misses the second whitelist, it means that the terminal device is not authenticated. Thus, the management device may return verification failure information to the verifying device.

Corresponding to the examples of the above method of verifying a terminal device, the present disclosure also provides examples of apparatuses for verifying a terminal device.

The examples of apparatuses for verifying a terminal device in the present disclosure may be applied to a verifying device or a management device. The examples of the apparatuses may be implemented by software and may also be implemented by hardware or by a combination of software and hardware. With implementation by software as an example, the apparatus, as a logical apparatus, is formed by reading corresponding computer program instructions stored in a non-volatile memory into an internal memory for running by a processor on a device where the apparatus is located.

Figure 5:
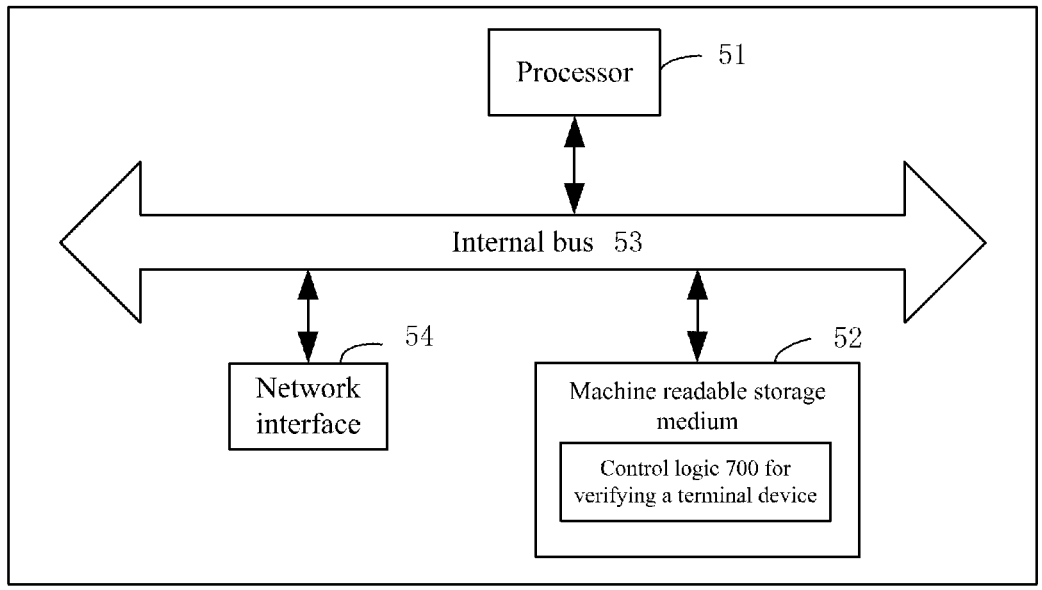
FIG. 5 is a schematic diagram illustrating a hardware structure of an apparatus where a device for verifying a terminal device is located according to an example of the present disclosure.

FIG. 5 is a schematic diagram illustrating a hardware structure of an apparatus where a device for verifying a terminal device is located according to an example of the present disclosure. The verification apparatus may include a processor 51 and a machine readable storage medium 52. The processor 51 and the machine readable storage medium 52 are usually connected mutually via an internal bus 53. In other possible implementations, the apparatus may also include a network interface 54 to communicate with other devices or components.

Figure 6:
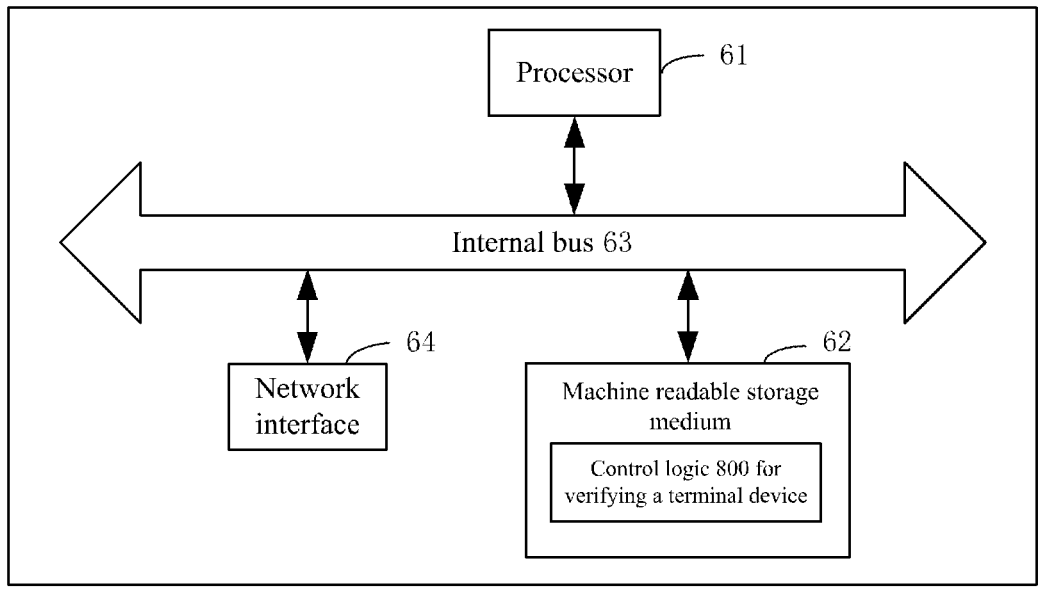
FIG. 6 is a schematic diagram illustrating a hardware structure of an apparatus where a device for verifying a terminal device is located according to another example of the present disclosure.

FIG. 6 is a schematic diagram illustrating a hardware structure of an apparatus where a device for verifying a terminal device is located according to another example of the present disclosure. The verification apparatus may include a processor 61 and a machine readable storage medium 62. The processor 61 and the machine readable storage medium 62 are usually connected with each other via an internal bus 63. In other possible implementations, the apparatus may also include a network interface 64 to communicate with other devices or components.

In different examples, the machine readable storage medium 52 and 62 may be: a Read-Only Memory (ROM), a volatile memory, a non-volatile memory, a flash memory, a storage drive (e.g. hard disk drive), a solid state hard disk, any type of storage disk (e.g., compact disk, Digital Video Disk (DVD)), or a similar storage medium, or a combination thereof.

Figure 7:
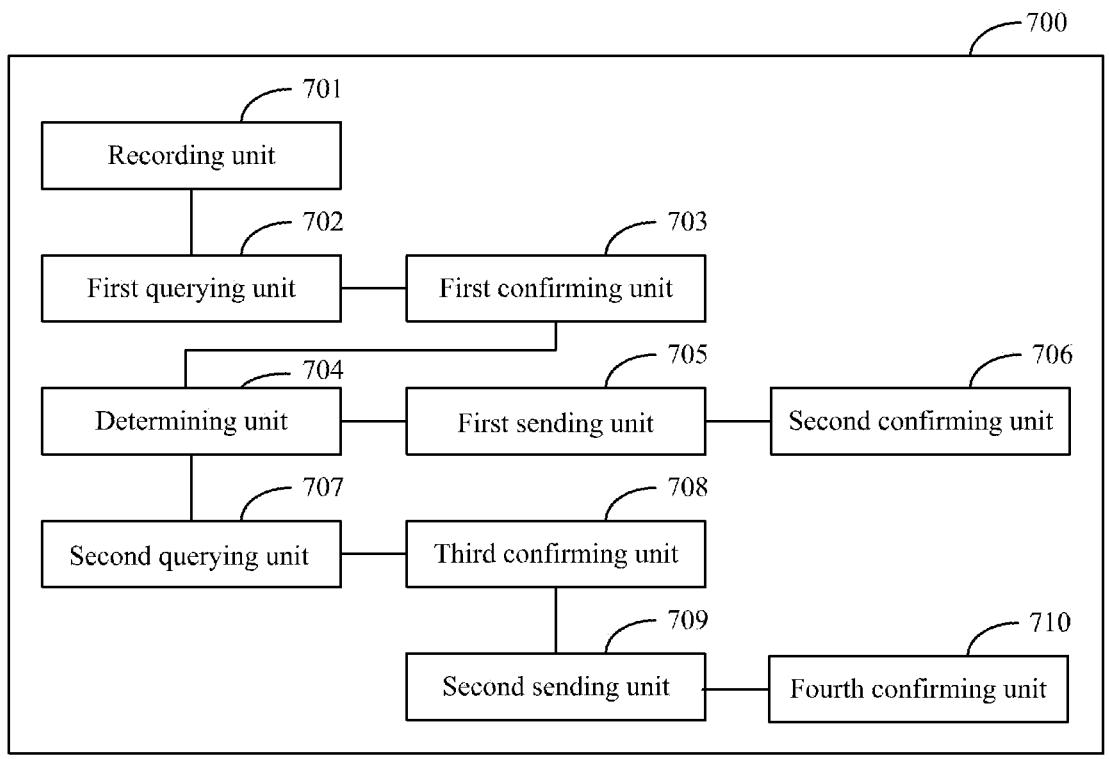
FIG. 7 is a block diagram illustrating an apparatus for verifying a terminal device according to an example of the present disclosure.

Further, the machine readable storage medium 52 may store control logic 700 for an verification apparatus. As shown in FIG. 7, the control logic 700 may functionally include a recording unit 701, a first querying unit 702, and a first confirming unit 703.

The recording unit 701 is configured to record a correspondence between a source IP address of the authentication message and an MAC address of the terminal device in a first whitelist after successful authentication is performed for the terminal device based on an authentication message. Where the authentication message carries the MAC address of the terminal device.

The first querying unit 702 is configured to query the first whitelist based on a source IP address of the data packet when a data packet from the terminal device is monitored.

The first confirming unit 703 is configured to confirming that the terminal device is has been authenticated when the source IP address hits the first whitelist.

In an alternative example, after the first confirming unit 703, the control logic 700 may also include a determining unit 704, a first sending unit 705, a second confirming unit 706, a second querying unit 707, a third confirming unit 708, a second sending unit 709 and a fourth confirming unit 710.

The determining unit 704 is configured to determine whether whether the terminal device and the verifying device are in a same layer 2 local area network when the source IP address misses the first whitelist.

The first sending unit 705 is configured to send the source IP address to a management device when the source IP address misses the first whitelist and the terminal device and the verifying device are not in the same layer 2 local area network so that the management device queries a second whitelist based on the source IP address and returns successful verification information when the source IP address hits the second whitelist, wherein the second whitelist is generated by the management device based on the first whitelist sent by the verifying device and received device information of the terminal device.

The second confirming unit 706 is configured to confirm that the terminal device has been authenticated when the successful verification information is received from the management device.

The second querying unit 707 is configured to query the first whitelist based on a source MAC address of the data packet when the terminal device and the verifying device are in a same layer 2 local area network.

The third confirming unit 708 is configured to confirm that the terminal device has been authenticated when the source MAC address hits the first whitelist.

The second sending unit 709 is configured to send the source MAC address to the management device when the source MAC address misses the first whitelist so that the management device queries the second whitelist based on the source MAC address and returns successful verification information when the source MAC address hits the second whitelist, wherein the second whitelist is generated by the management device based on the first whitelist sent by the verifying device and received device information of the terminal device.

The fourth confirming unit 710 is configured to confirm that the terminal device has been authenticated when the successful verification information is received from the management device.

Figure 8:
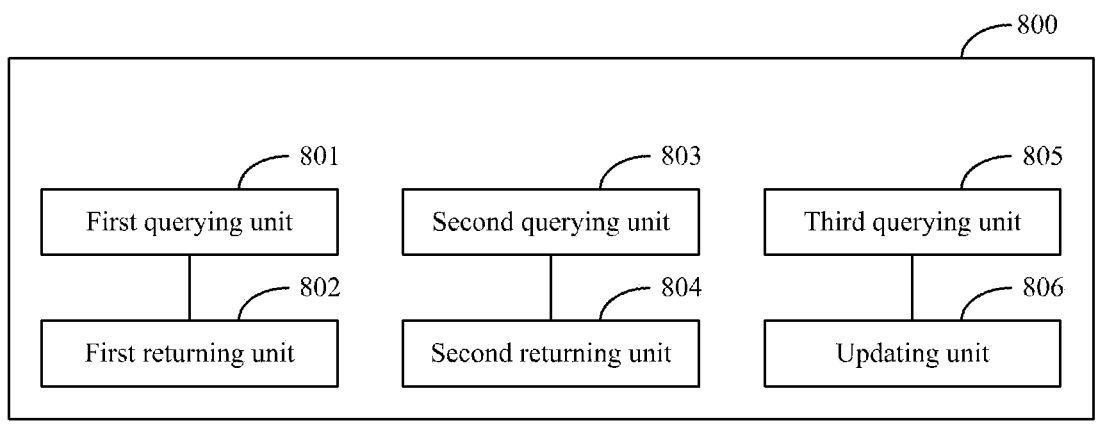
FIG. 8 is a block diagram illustrating an apparatus for verifying a terminal device according to another example of the present disclosure.

Further, the machine readable storage medium 62 stores control logic 800 for a verification apparatus. As shown in FIG. 8, the control logic may functionally include a first querying unit 801 and a returning unit 802.

The first querying unit 801 is configured to query a second whitelist based on an IP address when receiving the IP address from an verifying device, where the second whitelist is generated by a management device based on a first whitelist sent by an verifying device and received device information of a terminal device, the first whitelist comprises a correspondence between an MAC address of a terminal device successfully authenticated by the verifying device based on an authentication message and a source IP address of the authentication message, and the authentication message carries the MAC address of the terminal device.

The returning unit 802 is configured to return successful verification information to the verifying device when the source IP address hits the second whitelist, so that the verifying device confirms that the terminal device corresponding to the IP address has been authenticated when receiving the successful verification information.

In an alternative example, the control logic 800 may also include a second querying unit 803 and a second returning unit 804.

The second querying unit 803 is configured to query the second whitelist based on a source MAC address when the MAC address is received from the verifying device.

The second returning unit 804 is configured to return successful verification information to the verifying device when the MAC address hits the second whitelist, so that the verifying device confirms the terminal device corresponding to the MAC address has been authenticated when receiving the successful verification information.

In another alternative example, the control logic 800 may also include a third querying unit 805 and an updating unit 806.

The third querying unit 805 is configured to query the second whitelist based on an MAC address in device information after an advertisement message comprising the device information of a terminal device is received.

The updating unit 806 is configured to update an IP address corresponding to the MAC address in the second whitelist to an IP address in the device information when the MAC address in the device information hits the second whitelist.

The control logic 700 for a verification apparatus will be further detailed below with implementation by software as an example. The verification apparatus includes a verifying device. In this example, the control logic 700 of the present disclosure should be understood as computer instructions in a machine readable storage medium 52. When the processor 51 on the verification apparatus executes the control logic 700, the processor 51 may execute the following operations by invoking instructions corresponding to the control logic 700 and stored on the machine readable storage medium 52.

When the terminal device is authenticated based on an authentication message, a correspondence between a source IP address of the authentication message and an MAC address of the terminal device in a first whitelist is recorded, where the authentication message carries the MAC address of the terminal device.

When a data packet from the terminal device is monitored, the first whitelist is queried based on a source IP address of the data packet.

When the source IP address hits the first whitelist, the verifying device confirms that the terminal device has been authenticated.

Further, when the source IP address misses the first whitelist, the processor 51 may execute the followings operations by invoking instructions corresponding to the control logic 700 and stored on the machine readable storage medium 52.

The verifying device determined whether the terminal device and the verifying device are in a same layer 2 local area network.

When the terminal device and the verifying device are in a same layer 2 local area network, the first whitelist is queried based on a source MAC address of the data packet.

When the source MAC address hits the first whitelist, the verifying device confirms that the terminal device has been authenticated.

Further, when the source IP address misses the first whitelist and the terminal device and the verifying device are not in the same layer 2 local area network, the processor 51 may execute the followings operations by invoking instructions corresponding to the control logic 700 and stored on the machine readable storage medium 52.

When the source IP address misses the first whitelist and the terminal device and the verifying device are not in the same layer 2 local area network, sending the source IP address to a management device to cause the management device to query a second whitelist based on the source IP address; and return successful verification information when the source IP address hits the second whitelist, where the second whitelist is generated by the management device based on the first whitelist sent by the verifying device and received device information of the terminal device.

When the successful verification information is received from the management device, the verifying device confirms that the terminal device has been authenticated.

Further, when the source IP address misses the first whitelist and the terminal device and the verifying device are in the same layer 2 local area network, the processor 51 may execute the followings operations by invoking instructions corresponding to the control logic 700 and stored on the machine readable storage medium 52.

The source MAC address is sent to the management device, so that the management device queries the second whitelist based on the source MAC address and returns successful verification information when the source MAC address hits the second whitelist, the second whitelist is generated by the management device based on the first whitelist sent by the verifying device and received device information of the terminal device.

When the successful verification information is received from the management device, the verifying device confirms that the terminal device has been authenticated.

In one example of the present disclosure, the MAC address of the terminal device carried in the authentication message is added into the authentication message by the terminal device or an access device by which the terminal device accesses network.

In one example of the present disclosure, the successful verification information further includes device information of the terminal device in the second whitelist and the device information includes a correspondence between a first source IP address and a first MAC address of the terminal device.

Further, when the successful verification information is received from the management device the processor 51 may perform the following operations by reading machine readable instructions corresponding to the control logic 700 in a storage medium, the followings may be specifically included.

The first whitelist is queried based on the first MAC address.

When the first MAC address hits the first whitelist, a source IP address is updated corresponding to the hit MAC address to the first source IP address.

When the first MAC address misses the first whitelist, the correspondence between the first source IP address and the first MAC address is added to the first whitelist.

The control logic 800 for a verification apparatus will be further detailed below with implementation by software as an example. The verification apparatus includes a management device. In this example, the control logic 800 of the present disclosure should be understood as computer instructions in a machine readable storage medium 62. When the processor 61 on the verification apparatus executes the control logic 800, the processor 61 may execute the above operations by invoking instructions corresponding to the control logic 800 and stored on the machine readable storage medium 62.

When receiving an IP address from an verifying device, a second whitelist is queried based on the IP address, wherein the second whitelist is generated by a management device based on a first whitelist sent by an verifying device and received device information of a terminal device, the first whitelist comprises a correspondence between an MAC address of a terminal device successfully authenticated by the verifying device based on an authentication message and a source IP address of the authentication message, and the authentication message carries the MAC address of the terminal device.

When the IP address hits the second whitelist, successful verification information is returned to the verifying device so that the verifying device confirms that the terminal device corresponding to the IP address has been authenticated when receiving the successful verification information.

Further, when an MAC address is received from the verifying device, the processor 61 may execute the followings operations by invoking instructions corresponding to the control logic 800 and stored on the machine readable storage medium 62.

The second whitelist is queried based on the MAC address.

When the MAC address hits the second whitelist, successful verification information is returned to the verifying device so that the verifying device confirms the terminal device corresponding to the MAC address has been authenticated when receiving the successful verification information.

Further, after an advertisement message including device information of a terminal device is received, the processor 61 may execute the followings operations by invoking instructions corresponding to the control logic 800 and stored on the machine readable storage medium 62.

The second whitelist is queried based on an MAC address in the device information.

When the MAC address in the device information hits the second whitelist, an IP address corresponding to the MAC address in the second whitelist is updated to an IP address in the device information.

In these apparatus, the technical solution of the present disclosure is applicable to a case that a terminal device and a verifying device are not in a same local area network and an IP address of the terminal device is changeable. In this way, user operations are simplified and the possibility that the terminal device fails in verification due to IP address changing is reduced.

Further, the theme and functional operations described in the above examples may be implemented by using a digital electronic circuit, a tangibly-embodied computer software or firmware, a computer hardware including a structure of the present disclosure and an equivalent structure, or one or more combinations thereof. Examples of the theme described in the present disclosure may be implemented as one or more computer programs, namely, as one or more modules in computer program instructions encoded on a tangible non-transitory program carrier to be executed by a data processing device or to control operations of a data processing device. Alternatively or additionally, the program instructions may be encoded on an artificially generated transmission signal, such as electric, optical and electromagnetic signals generated by a machine and the signal is generated to encode and transmit information to an appropriate receiver device for execution by a data processing device. The computer storage medium may be a machine readable storage device, a machine readable storage substrate, a random or serial access memory device, or one or more combinations thereof.

Processing and logical flows described in the present disclosure may be executed by one or more programmable computers for executing one or more computer programs, to perform corresponding functions by operating based on input data and generating an output. The processing and logical flows may also be executed by a dedicated logical circuit, such as a Field Programmable Gate Array (FPGA) or an Application Specific Integrated Circuit (ASIC), and the device may also be implemented as a dedicated logical circuit.

Computers applicable to executing computer programs include, for example, a universal and/or dedicated microprocessor, or any other type of central processing unit. Usually, the central processing unit will receive instructions and data from a read-only memory and/or a random access memory. Basic components of the computer include a central processing unit for implementing or executing instructions and one or more memory devices storing instructions and data. Usually, the computer may also include one or more mass storage devices for storing data, such as a magnetic disk, a magneto-optical disk or an optical disk, or the computer will be operably coupled to the mass storage device to receive data from the mass storage device or transmit data to the mass storage device, or to do both. However, the computer may not necessarily have such device. Further, the computer may be embedded in another device, such as a mobile phone, a Personal Digital Assistant (PDA), a mobile audio or video player, a Global Positioning System (GPS) receiver, or a portable storage device such as a Universal Serial Bus (USB) flash drive, which are only illustrated as examples.

Computer readable mediums applicable to storing computer program instructions and data include all forms of non-volatile memories, media and memory devices, such as a semiconductor memory device (e.g., an Erasable Programmable Read-Only Memory (EPROM), an Electrically Erasable Programmable Read-Only Memory (EEPROM), and a flash memory device), a magnetic disk (e.g., an internal hard disk or a mobile disk), a magneto-optical disk and CD-ROM and DVD-ROM disks. The processor and the memory may be supplemented by or incorporated in a dedicated logical circuit.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

What is claimed is:

1. A method of verifying a terminal device, the method being applied to a verifying device, and comprising:
   when the terminal device is authenticated based on an authentication message, recording a correspondence between a source IP address of the authentication message and a MAC address of the terminal device in a first whitelist, wherein the authentication message carries the MAC address of the terminal device;
   when a data packet from the terminal device is monitored, querying the first whitelist based on a source IP address of the data packet;
   when the source IP address of the data packet hits the first whitelist, confirming that the terminal device has been authenticated,
   when the source IP address of the data packet misses the first whitelist, determining whether the terminal device and the verifying device are in a same layer 2 local area network;
   when the terminal device and the verifying device are in the same layer 2 local area network, querying the first whitelist based on a source MAC address of the data packet;
   when the source MAC address hits the first whitelist, confirming that the terminal device has been authenticated,
   when the source IP address of the data packet misses the first whitelist and the terminal device and the verifying device are not in the same layer 2 local area network, sending the source IP address of the data packet to a management device to cause the management device to query a second whitelist based on the source IP address of the data packet; and
   return successful verification information when the source IP address of the data packet hits the second whitelist,
   wherein the second whitelist is generated by the management device based on the first whitelist sent by the verifying device and received device information of the terminal device; and
   when the successful verification information is received from the management device, confirming that the terminal device has been authenticated.

2. The method according to claim 1, further comprising:
when the source MAC address misses the first whitelist,
sending the source MAC address to the management device to cause the management device to
query the second whitelist based on the source MAC address; and
return successful verification information when the source MAC address hits the second whitelist,
wherein the second whitelist is generated by the management device based on the first whitelist sent by the verifying device and received device information of the terminal device; and
when the successful verification information is received from the management device, confirming that the terminal device has been authenticated.

3. The method according to claim 1, wherein the MAC address of the terminal device carried in the authentication message is added into the authentication message by the terminal device or an access device by which the terminal device accesses network.

4. The method according to claim 1, wherein
the successful verification information further comprises device information of the terminal device in the second whitelist; and
the device information comprises a correspondence between a first source IP address and a first MAC address of the terminal device.

5. The method according to claim 4, wherein, when the successful verification information is received from the management device, the method further comprising:
querying the first whitelist based on the first MAC address;
when the first MAC address hits the first whitelist, updating a source IP address corresponding to the hit MAC address to the first source IP address; or
when the first MAC address misses the first whitelist, adding the correspondence between the first source IP address and the first MAC address to the first whitelist.

6. A method of verifying a terminal device, the method being applied to a management device, and comprising:
when receiving an IP address from a verifying device, querying a second whitelist based on the IP address, wherein the second whitelist is generated by the management device based on a first whitelist sent by a verifying device and received device information of the terminal device, the first whitelist comprises a correspondence between a MAC address of a terminal device successfully authenticated by the verifying device based on an authentication message and a source IP address of the authentication message, and the authentication message carries the MAC address of the terminal device; and
when the IP address hits the second whitelist, returning successful verification information to the verifying device so that the verifying device confirms that the terminal device corresponding to the IP address has been authenticated when receiving the successful verification information.

7. The method according to claim 6, comprising:
when the MAC address is received from the verifying device, querying the second whitelist based on the MAC address; and
when the MAC address hits the second whitelist, returning successful verification information to the verifying device so that the verifying device confirms the terminal device corresponding to the MAC address has been authenticated when receiving the successful verification information.

8. The method according to claim 6, further comprising:
after an advertisement message comprising device information of a terminal device is received, querying the second whitelist based on a MAC address in the device information; and
when the MAC address in the device information hits the second whitelist, updating an IP address corresponding to the MAC address in the second whitelist to an IP address in the device information.

9. An apparatus for verifying a terminal device as a component of a verifying device, the apparatus comprising a processor, wherein the processor is caused by reading and executing machine executable instructions corresponding to logic for verifying a terminal device and stored on a non-transitory machine-readable storage medium to:
when the terminal device is authenticated based on an authentication message, record a correspondence between a source IP address of the authentication message and a MAC address of the terminal device in a first whitelist, wherein the authentication message carries the MAC address of the terminal device;
when a data packet from the terminal device is monitored, query the first whitelist based on a source IP address of the data packet;
when the source IP address of the data packet hits the first whitelist, confirm that the terminal device has been authenticated,
when the source IP address of the data packet misses the first whitelist, determine whether the terminal device and the verifying device are in a same local area network;
when the terminal device and the verifying device are in a same layer 2 local area network, query the first whitelist based on a source MAC address of the data packet;
when the source MAC address hits the first whitelist, confirm that the terminal device has been authenticated,
when the source IP address of the data packet misses the first whitelist and the terminal device and the verifying device are not in the same layer 2 local area network, send the source IP address of the data packet to a management device to cause the management device to query a second whitelist based on the source IP address of the data packet; and
return successful verification information when the source IP address of the data packet hits the second whitelist,
wherein the second whitelist is generated by the management device based on the first whitelist sent by the verifying device and received device information of the terminal device; and
when the successful verification information is received from the management device, confirm that the terminal device has been authenticated.

10. The apparatus according to claim 9, wherein the machine executable instructions further cause the processor to:
when the source MAC address misses the first whitelist, send the source MAC address to the management device to cause the management device to
query the second whitelist based on the source MAC address; and
return successful verification information when the source MAC address hits the second whitelist, wherein the second whitelist is generated by the management device based on the first whitelist sent by the verifying device and received device information of the terminal device; and when the successful verification information is received from the management device, confirm that the terminal device has been authenticated.

11. The apparatus according to claim 9, wherein the MAC address of the terminal device carried in the authentication message is added into the authentication message by the terminal device or an access device by which the terminal device accesses network.

12. The apparatus according to claim 9, wherein
the successful verification information further comprises device information of the terminal device in the second whitelist; and
the device information comprises a correspondence between a first source IP address and a first MAC address of the terminal device.

13. The apparatus according to claim 12, wherein when the successful verification information is received from the management device, the machine executable instructions further cause the processor to:
query the first whitelist based on the first MAC address;
when the first MAC address hits the first whitelist, update a source IP address corresponding to the hit MAC address to the first source IP address; or
when the first MAC address misses the first whitelist, add the correspondence between the first source IP address and the first MAC address to the first whitelist.

14. An apparatus for verifying a terminal device as a component of a management device, comprising a processor, wherein the processor is caused by reading and executing machine executable instructions corresponding to logic for verifying the terminal device and stored on a non-transitory machine-readable storage medium to execute the method of the claim 6.

15. The apparatus according to claim 14, wherein the machine executable instructions cause the processor to:
when the MAC address is received from the verifying device, query the second whitelist based on the MAC address; and
when the MAC address hits the second whitelist, return successful verification information to the verifying device, so that the verifying device confirms that the terminal device corresponding to the MAC address has been authenticated when receiving the successful verification information.

16. The apparatus according to claim 14, wherein the machine executable instructions further cause the processor to: after an advertisement message comprising device information of the terminal device is received, query the second whitelist based on a MAC address in the device information; and
when the MAC address in the device information hits the second whitelist, update an IP address corresponding to the MAC address in the second whitelist to an IP address in the device information.

* * * * *